Figure 1:
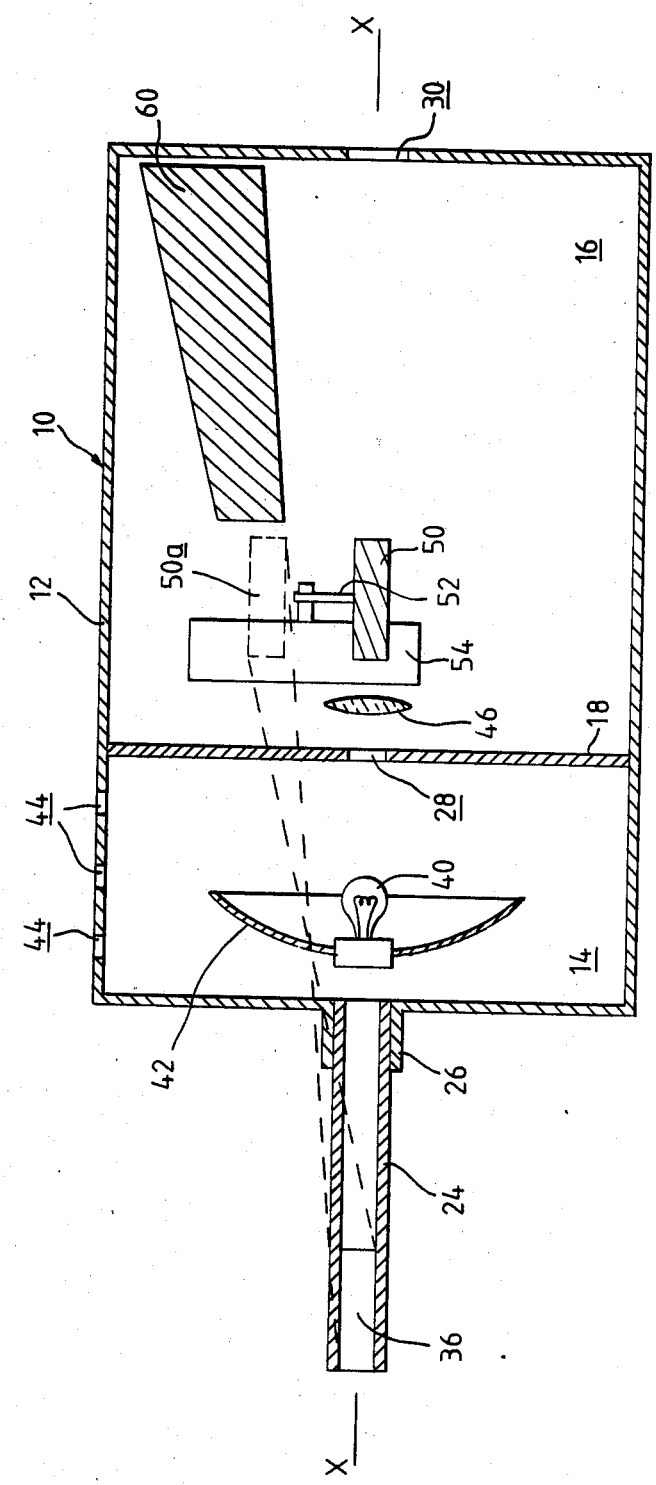

United States Patent [19]
Garlick

[11] Patent Number: 4,675,523
[45] Date of Patent: Jun. 23, 1987

[54] DIRECTIONAL GAMMA RAY MONITOR

[75] Inventor: David R. Garlick, Abingdon, England

[73] Assignee: United Kingdom Atomic Energy Authority, London, England

[21] Appl. No.: 697,723

[22] Filed: Feb. 4, 1985

[30] Foreign Application Priority Data

Feb. 17, 1984 [GB] United Kingdom ............... 8404248

[51] Int. Cl.$^4$ .................... G01D 18/00; G01T 1/18
[52] U.S. Cl. ........................... 250/252.1; 250/374; 250/505.1
[58] Field of Search ............... 250/252.1, 266, 358.1, 250/374, 505.1

[56] References Cited
U.S. PATENT DOCUMENTS 3,529,153  9/1970  Zimmerman et al. ........... 250/252.1
4,424,443  1/1984  Reuland ........................... 250/252.1

OTHER PUBLICATIONS

Morfill, G., "A Directional Low Energy Gamma-Ray Detector", Proc. Conf. on Transient Cosmic Gamma and X-Ray Sources (1974), p. 206.

Benson, J., " . . . Passively Anti-Collimated (PAC) Gamma-Ray Telescope", North-Holland Publishing Co. (1981), pp. 613–617.

Primary Examiner—Janice A. Howell
Attorney, Agent, or Firm—William R. Hinds

[57] ABSTRACT

A directional gamma ray monitor is based on a method for measuring the gamma ray flux within a small solid angle. The method entails measuring the flux incident on a detector 36, measuring the flux incident on the detector 36 when behind a shielding block 50, which is arranged to subtend the said small solid angle with the detector 36, and determining the difference between the two measurements. In an apparatus for carrying out the method, the shielding block 50 is moved between a position when it is on the axis of a gamma ray detector 36 and a position where it is displaced from the axis of the gamma ray detector 36.

10 Claims, 1 Drawing Figure

DIRECTIONAL GAMMA RAY MONITOR

The invention relates to detectors of gamma radiation, for use for example in assessing the distribution and degree of radioactive contamination on a structure, and also relates to methods of measuring gamma radiation.

In the assessment of radioactive contamination of a structure, a portable instrument capable of measuring gamma ray flux incident from directions within a small angle of the axis of the instrument, while being unaffected by radiation from other directions, would be very useful in locating souces of gamma radiation. It is more difficult to design such an instrument for gamma radiation than for alpha or beta radiation, as a shielding layer a few millimeters thick of say aluminium will stop both alpha and beta particles, whereas a shielding layer of say lead, however thick, can only attenuate gamma radiation, decreasing its intensity but not stopping it, and so known directional gamma ray detectors are heavy, requiring a large mass of lead shielding.

According to a first aspect of the invention there is provided a method of measuring gamma flux incident within a small angle of an axis comprising, measuring gamma flux incident on a detector, measuring gamma flux incident on the detector with shielding means displaced from the detector in an axial direction so as to co-operate with the detector to define the said small angle, and calculating the difference between the two measurements of gamma flux.

The two measurements may be made by moving the shielding means between an off-axis position in which it has no significant effect on gamma flux reaching the detector, and the aforementioned axial position.

According to a second aspect of the invention there is provided an instrument for measuring gamma ray flux incident within a small angle of an axis, the instrument comprising a detector of gamma rays, a shielding block positioned so as to leave the detector exposed to gamma rays incident within the small angle of the axis, and a shielding slug movable between a position on the axis of the instrument at which the slug defines a small angle in co-operation with the detector, and a second position in the same direction from the detector as the shielding block, and means for determining the difference between the gamma flux detected by the detector with the slug in the two positions.

Preferably the slug is sufficiently long to attenuate gamma flux passing axially through it by a factor of ten, and the shielding block is long enough to attenuate gamma flux passing through it by a factor of $10^n$ where n is desirably at least three. The detector may be surrounded with shielding material in all directions except along the incident axis, and such shielding material is desirably thick enough to attenuate gamma flux passing through it by a factor of at least ten.

The invention will now be further described by way of example only and with reference to the accompanying drawing which shows an axial sectional view of a directional gamma ray monitor.

Referring to the drawing, a directional gamma ray monitor 10 comprises a thin walled rectangular box 12 of aluminum divided into two compartments 14, 16, by a dividing sheet 18. A rigid tube 24 of material with minimal gamma absorption properties, such as synthetic resin bonded fibres, extends from a hollow central boss 26 on one end of the box 12, the axis of the tube 24 being aligned with holes 28 and 30 through the dividing sheet 18 and the other end of the box 12 respectively, and so defining an axis X—X of the monitor 10. The end of the tube 24 remote from the box 12 locates a gamma-detecting Geiger-Müller tube 36.

A lamp 40 and reflector 42 are mounted inside the compartment 14 on the axis X—X to illuminate the hole 28 in the dividing sheet 18, the upper wall of the compartment 14 having slots 44 to allow ventilation. On the other side of the hole 28 in the compartment 16 is mounted a lens 46 to provide a beam of light along the axis X—X emerging from the hole 30 when the lamp 40 is energised from a source of power, which is not shown in the Figure.

A cylindrical lead slug 50 of the same diameter as the hole 30 is supported within the compartment 16 on an arm 52 of a rotary solenoid 54, and is of length 35 mm, this being the thickness of lead required to reduce the intensity of 1 MeV gamma rays by a factor of ten. The slug 50 is movable by operation of the solenoid 54 between an on-axis position (as shown) in which it shields the Geiger-Müuller tube 36 from gamma radiation incident along the axis X—X, (and obstructs the light beam) and an off-axis location 50a, shown by broken lines. Radiation incident on the Geiger-Müller tube 36 from the direction of the off-axis slug location 50a is shielded by an off-axis lead shielding block 60, of length 105mm and whose shape is such that every part of the Geiger-Müller tube 36 is shielded by the block 60 from radiation proceeding in directions which pass through the off-axis slug location 50a.

In operation of the monitor 10 the light beam from the lamp 40 is used to provide a visible indication of the direction in which the axis X—X is oriented. The monitor 10 is scanned over a surface the contamination of which is to be assessed, and readings of count rate of the Geiger-Müller tube 36 are taken with the lead slug 50 alternately in the axial and off-axis locations. The difference between these two values of count rate is a measure of the gamma radiation flux incident on the Geiger-Müller tube 36 along the direction of the axis X—X, and within a small angle of the axis X—X within which the slug 50 at least partly shields the Geiger-Müller tube 36. The magnitude of the angle is determined by the diameters and lengths of the slug 50 and of the Geiger-Müller tube 36 and the distance from the slug 50 to the Geiger-Müller tube 36, and may be estimated as the angle between straight lines from points on the left and the right hand side half-way along the length of the Geiger-Müller tube 36 to points on the right and the left hand side respectively, half-way along the length of the slug 50.

The radiation incident on the monitor 10 can be considered as having three components:
 (i) "signal" radiation, incident within the small angle of the axis X—X, say S;
 (ii) "ghost" radiation, incident from the direction of the off-axis slug location 50a, say G; and
 (iii) background radiation, incident from any other direction, say B.

The two values of count rate given by the Geiger-Müller tube 36 with the slug 50 in the off-axis and axial positions are therefore:
 off axis: count rate$=S+G/10^4+B$
 on axis:
  count rate$=S/10+G/10^3+B$
  difference$=0.9S-0.9\times10^{-3}G$
 Unless $G>10^2\times S$, we can ignore G, and then we have: difference$=0.9S$ It will be appreciated that in view of the random nature of gamma emission each of the terms B, S and G will have an uncertainty associated with it, and so the above equations are not exact relationships. However the longer the period of time over which the count rate is assessed the smaller (in percentage terms) is the uncertainty. Consequently the monitor 10 takes repeated measurements of the above difference until the average value of the difference is found to give a stable value.

Thus subject to the above provisos the difference between the two values of count rate is a measure of the intensity of radiation within the small angle of the axis X—X.

The monitor 10 may, if required, be calibrated by using a gamma source of known intensity.

Electrical connections to the Geiger-Müller tube 36 may be made by conductors (not shown) running along the tube 24 to terminals (not shown) in the boss 26. Geiger-Müller tubes 36 of different sensitivites in tubes 24 of different lengths may be used in place of the Geiger-Müller tube 36 and tube 24 shown, as long as the dimensions of the shielding block 60 are such as to shield all the different positions of the Geiger-Müller tubes 36 from radiation proceeding in directions which pass through the off-axis slug location 50a.

If desired, additional lead shielding (not shown) may be provided around the Geiger-Müller tube 36, to reduce the background component of radiation incident upon the Geiger-Müller tube 36.

The monitor 10 may be scanned several times horizontally across a structure and an image obtained showing how the radioactive gamma-emitting contamination varies over a structure. This may be combined with a visible image of the structure produced for example by a TV camera.

It will also be appreciated that the Geiger-Müller tube 36 may be replaced by another kind of gamma ray detector, such as sodium iodide detector or a cadmium telluride crystal detector.

I claim:

1. A method of compensating for non-axial background flux when measuring gamma flux incident within a small angle of an axis comprising, measuring gamma flux incident on a detector; locating a shielding means at a position displaced from the detector in an axial direction so as to co-operate with the detector to define the said small angle and to shield the detector from the axial flux, and again measuring the gamma flux incident on the detector; and calculating the difference between the two measurements of gamma flux so as to compensate for any non-axial background flux.

2. A method as claimed in claim 1 wherein the two measurements are made by moving the shielding means between an off-axis position in which it has no significant effect on gamma flux reaching the detector, and the aforementioned axial position.

3. A method of compensating for non-axial background flux when measuring gamma flux incident within a small angle of an axis comprising performing the method as claimed in claim 1 repeatedly, calculating the average value of the differences calculated in successive determinations, and continuing the repeated performance until the average value is stable.

4. An instrument for measuring gamma ray flux incident within a small angle of an axis, said flux being referred to as axial flux, while compensating for non-axial background flux, the instrument comprising a detector of gamma rays, a shielding block positioned so as to leave the detector exposed to gamma rays incident within the small angle of the axis, and a shielding slug movable between a position on the axis of the instrument at which the slug defines the said small angle in co-operation with the detector and shields the detector from the axial flux, and a second position in the same direction from the detector as the shielding block, and means for determining the difference between the gamma flux detected by the detector with the slug in the two positions so as to obtain a measure of the axial flux compensated for any non-axial background flux.

5. An instrument as claimed in claim 4 wherein the slug is sufficiently long to attenuate gamma flux passing through it by a factor of ten.

6. An instrument as claimed in claim 4 wherein the shielding block is long enough to attenuate gamma flux passing through it by a factor of $10^n$ where n is at least three.

7. An instrument as claimed in claim 4 also comprising means for producing a light beam along the axis of the instrument.

8. An instrument as claimed in claim 4 also comprising shielding means to shield the detector from gamma flux incident from directions outside the small angle of the axis.

9. An instrument as claimed in claim 4 also comprising means for scanning the direction of the axis, and for providing a visible display of the gamma flux incident from the different directions.

10. A method of measuring gamma flux incident within a small angle of an axis, said flux being referred to as axial flux, where there is also a nonaxial background flux, comprising, locating a detector on the axis; locating a shielding means at such a location as to have negligible effect on both the axial flux and the background flux incident on the detector and measuring the flux incident on the detector; moving the shielding means to a location so as to shield the detecdtor from the axial flux only, and again measuring the flux incident on the detector; and determining the difference between the two measurements of flux so as to compensate for the effect of the background flux.

* * * * *